United States Patent [19]

Kihlstedt et al.

[11] 4,132,559

[45] Jan. 2, 1979

[54] STARTING MATERIAL FOR HIGH-STRENGTH HYDROTHERMALLY TREATED OBJECTS, AND A METHOD OF PRODUCING SUCH MATERIAL

[75] Inventors: Per G. Kihlstedt, Bromma; Hedvig E. B. Hässler, Enskede, both of Sweden

[73] Assignee: Advanced Mineral Research AB, Stockholm, Sweden

[21] Appl. No.: 790,979

[22] Filed: Apr. 26, 1977

[30] Foreign Application Priority Data

Apr. 28, 1976 [SE] Sweden .............................. 7604897

[51] Int. Cl.$^2$ .............................................. C04B 7/16
[52] U.S. Cl. .................................................. 106/117
[58] Field of Search ................................ 106/117, 120

[56] References Cited

U.S. PATENT DOCUMENTS

| 3,202,522 | 8/1965 | Yang et al. | 106/120 |
| 3,449,140 | 6/1969 | Yang | 106/117 |
| 3,582,377 | 6/1971 | Hays et al. | 106/120 |
| 3,859,105 | 1/1975 | Feder | 106/120 |

Primary Examiner—James Poer
Attorney, Agent, or Firm—Fleit & Jacobson

[57] ABSTRACT

A starting material for the manufacture of shaped and hydrothermally hardened products is composed of a binding agent comprising finely-divided olivine having a specific outer surface of at least 25 000 cm$^2$/cm$^3$, measured according to the permeability method, and finely-divided silica material in a quantity which is at most equal to the solid volume of said olivine and a ballast material in an amount of 50 – 80% by volume of the starting material and comprising particulate ultrabasic rock or slag material having a particle size of 80% smaller than 200 – 1000 μm.

21 Claims, No Drawings

STARTING MATERIAL FOR HIGH-STRENGTH HYDROTHERMALLY TREATED OBJECTS, AND A METHOD OF PRODUCING SUCH MATERIAL

The present invention relates to a starting material for manufacturing shaped objects hardened by hydrothermal treatment processes, and a method of manufacturing such starting material.

Hitherto, starting materials for producing objects which are hardened by hydrothermal treatment processes, especially building stones and blocks, such as lime-sand bricks, Ytong and Siporex, have been based on the ability of the lime-quartz materials in finely divided form to react with each other in condensing steam at temperatures of approximately 200° C. to form calcium-silicate-hydrate-type bonds. One disadvantage in this respect, however, is that significant quantities of energy are required to burn the lime and/or cement for the binding phase in the starting material and that shaped and hardened objects produced from the starting material exhibit poor mechanical strength and fire resistance.

In order to overcome the aforementioned disadvantages, there is proposed in accordance with the invention a starting material from which shaped and hydrothermally hardened objects, such as building stones, building blocks, building plates and pipes, can be produced, said starting material comprising mainly a mixture of (a) material of the olivine type (i.e. comprising natural olivine or material having a composition and a crystallographic structure, substantially similar to that of natural olivine) finely divided to a powdered product having a specific outer surface of at least approximately 25 000 $cm^2/cm^3$, measured in accordance with the permeability method (e.g. similar to Blaine), (b) finely divided silica material in a quantity which is at most equal to the solid volume of said powdered product and having such a small particle size that at least a predominant portion of said silica reacts during the hydrothermal treatment process, (c) ultra-basic rock and/or ultra-basic slag material (i.e. a slag material, such as copper ore smelting slag, having a mineralogic and crystallographic structure substantially similar to that of ultra-basic rock, although normally substantially richer in iron oxide than ultra-basic rock) finely divided to a particle size of 80% smaller than 200 – 1000 $\mu m$ and comprising 50 – 80% of the total solid volume of the mixture.

In principle, olivine comprises a magnesium silicate, $2MgO \cdot SiO_2$, often containing iron, the magnesium oxide then being partially, and in some cases substantially completely, replaced by FeO. When hydrothermally treating a shaped object produced from moist starting material according to the present invention, the finely divided olivine apparently reacts to a certain extent to form magnesium hydrosilicates whilst releasing certain quantities of magnesium oxide, which in turn apparently react with silica present in the starting material. Even olivine material which is very rich in iron oxide has exhibited, however, correspondingly high reaction ability. The shaped object obtains upon steam-hardening a high strength greater than that of a corresponding object which has been hardened on the basis of lime-quartz reactions. It should be noted, however, that no burning corresponding to lime or cement burning need be carried out.

In order to obtain a high mechanical strength, the starting material must exhibit a high specific outer surface. When burning lime, carbon dioxide departs during the decomposition of the calcium carbonate and the crystal lattice is broken up, which normally imparts to the burned and slaked lime a specific outer surface area of approximately 35 000 $cm^2/cm^3$, measured according to the permeability method. In accordance with the invention, the powdered product comprising material of the olivine type must be mechanically ground to a specific outer surface which is at least substantially equal to that aforementioned. While approximately 1500 – 2000 kWh per ton of burned product is required to burn lime, the amount of energy consumed when grinding olivine to a specific surface area of 35,000 $cm^2/cm^3$ is only 250–500 kWh per ton of ground product. A considerable amount of energy can thus be saved.

As beforementioned, the silica material used in accordance with the invention, which may comprise dust obtained from quartz crushing plants or so-called silicon fume obtained from ferro-alloy production plants, would seem to react with magnesia released during the steam-autoclaving treatment. It also lies within the scope of the invention, however, to use silica material in the form of quartz-glass fibres, whereby unreacted portions of said fibres may form reinforcing filaments which will improve the tensile strength and bending strength of objects produced from the starting material. Suitably, the silica material comprises approximately 1 – 7% of the total solid volume of the starting material, optimal strength properties normally being obtained with a silica quantity of approximately 3 – 4% by volume silica. The particle size of the silica material is preferably approximately of the same order of magnitude as the particle size of said material of olivine type.

The mechanical strength of hydrothermally treated objects produced from the starting material according to the present invention is also dependent upon the compactness of the starting material. In order for the compactness of the starting material to become satisfactory, the particle size distribution must be so chosen that the starting material contains a certain percentage of coarse-grain material. In accordance with the invention, this coarse-grain material may be ultra-basic rock and/or ultra-basic slag material, comprising 50 – 80%, preferably approximately 65% of the total solid volume of the mixture. For example a starting material having a grain size approximately corresponding to 80% smaller than 300 $\mu m$ (80% by volume of the starting material passes through a screen having a mesh size of 300 $\mu m$), provides a compact, mass when, at the same time, the total specific outer surface of the starting material is approximately 20 000 $cm^2/cm^3$, measured according to the permeability method. A particle size distribution providing such a compact mass is obtained, for example, when roughly two parts by volume of coarse-grain material (ultra-basic rock and/or ultra-basic slag material) having a particle size approximately corresponding to 80% smaller than 500 $\mu m$ are mixed with approximately one part by volume finely-ground powdered product and silica. A preferred particle size of the coarse-grain material is one approximately corresponding to 80% smaller than 500 $\mu m$, the particle size of the said powdered product being adjusted accordingly to provide a compact starting material.

The mechanical strength of objects produced from starting material according to the invention, would also seem to be dependent upon the total specific outer surface of the starting material, and hence the said powdered product is conveniently subjected to extensive grinding. Good results are obtained with a starting material in which said powdered product is ground to a specific outer surface of 50 000 – 200 000 $cm^2/cm^3$, for example a specific outer surface of approximately 70 000 – 90 000 $cm^2/cm^3$.

It has been found an advantage to permit the coarse-grain material to be of the olivine type, even though the quality of said material need not be as high as the quality of the said powdered product. Thus, slag material may conveniently form part of the coarse-grain material.

Apparently the hydrothermal reaction is furthered by high basicity of the mass during the autoclaving operation. Normally, the olivine material affords a buffered pH of 9.5 – 9.8 and it is therefore to advantage when the starting material also contains a strongly basic substance, such as slaked lime or sodium hydroxide in quantities sufficient to raise the pH of the mixture to a value above 10, for example up to approximately 12 with regard to lime, or to a higher pH when using other strong bases.

Prior to transporting the starting material according to the invention, the starting material may be moistened somewhat in order to settle dust during handling thereof, and since the material in its unhardened state has a very stiff consistency (a high resistance to sheer) the material is suitably granulated when being moistened. Furthermore, a granulated starting material does not readily segregate, whilst at the same time it obtains a readily-pourable bulk character which facilitates handling of the material and also the filling of the same into moulds etc. used for shaping objects from the starting material.

In the manufacture of the starting material according to the invention, material of the olivine type is ground to a powdered product having a specific outer surface of at least 25 000 $cm^2/cm^3$, suitably 50 000 – 200 000 $cm^2/cm^3$, measured in accordance with the permeability method, this powdered product being mixed with finely divided silica material in a quantity at most equal to the solid volume of said powdered product, the silica material suitably comprising 1 – 7%, preferably 3 – 4% of the total solid volume of the mixture, the particle size of the silica material being of such small magnitude that at least a predominant portion of said silica material reacts during the hydrothermal treatment process, and is also mixed with ultra-basic rock and/or ultra-basic slag material finely divided to a particle size of 80% smaller than 200 – 1000 $\mu m$, preferably of a magnitude of 80% smaller than 500 $\mu m$, and comprising 50 – 80%, preferably 65% of the total solid volume of the mixture. The ultra-basic rock and/or ultra-basic slag material may conveniently be material of the olivine type and a strongly basic substance may, in accordance with the invention, be added to the mixture, this substance preferably being slaked lime, in a quantity sufficient to increase the pH of the mixture to above 10, e.g. in a quantity of about 1% by weight of the starting material, calculated as CaO. As before mentioned, the starting material is conveniently granulated to facilitate handling of the same.

Grinding of the material of the olivine type to the small particle size prescribed by the present invention can cause practical difficulties. The amount of energy required in this respect is normally in access of 200 kWh/ton. The difficulties, however, can be counteracted to a large extent by, inter alia, using a closed dry-grinding circuit and by wind-sifting the ready-ground powdered product, which also facilitates the actual grinding process. Grinding of the said material is advantageously carried out in vibration mills, since these mills have been found to overcome the adhering or cladding problems occurring with extensive grinding operations much more effectively than mills of other types.

When manufacturing objects, such as construction and building materials in the form of blocks, plates (also corrugated or otherwise shaped plates) and pipes etc., from the starting material according to the invention, which manufacture and objects resulting therefrom also fall within the scope of the invention, the material is shaped in the desired manner and compacted. To facilitate shaping of the starting material, the material may be moistened prior to shaping. Subsequent to an optional partial drying the shaped and compacted object is treated hydrothermally, this treatment process being conveniently effected with a moist water vapour, optionally containing carbon dioxide, at a temperature of 175 – 300° C., preferably 190 – 250° C. The mechanical strength of the hydrothermally treated object can, in certain cases, be increased by subjecting the object to a further hardening process, in which the object is heated in a substantially dry environment to a temperature of approximately 200 – 900° C. The hydrothermally treated and, optionally, subsequently further hardened object can be sealed by filling the pores of the whole of the object or parts of the same, for example with a plastics material, wherewith it is also possible in conjunction with shaping the object, or subsequent to hardening the same, to decorate or coat one or more defining surfaces of the object.

EXAMPLE

Plates for building construction purposes were manufactured from a starting material comprising 97% by weight natural olivine and 3% by weight silica. The starting material was composed of 65% by weight coarse-grain olivine having a particle size distribution of 80% smaller than 350 $\mu m$, 32% by weight olivine which had been ground in a vibration mill to a particle size distribution of 80% smaller than 10 $\mu m$, and 3% by weight of finely divided silica having a particle size distribution of 80% smaller than 13.5 $\mu m$. The components of the starting material were intimately mixed by slightly grinding them together in a rod mill, and the total mixture had a particle size distribution of 80% smaller than 270 $\mu m$, a density of 3.21 $g/cm^3$, and a total specific outer surface of 17700 $cm^2/cm^3$. The total mixture contained 46% by weight MgO, 45% by weight $SiO_2$, 7% by weight FeO, 0.2% by weight CaO and 0.6% by weight $Al_2O_3$.

Water was added to the mixture in an amount of 6% by weight, calculated on the dry mixture. The moist mixture was then shaped into plates by using a press exerting a pressure somewhat above 500 $kp/cm^2$. The dimensions of the shaped plates were 600 mm × 600 mm × 9 mm, and the plates were stacked into packages, each having a weight of about 80 kg. The individual plates in each package were arranged vertically and were spaced from each other by means of spacer elements to allow air and steam to reach the opposite surfaces of each plate. The packages were dried during about 5 hours in a drying chamber which was kept at a temperature of approximately 100° C., and the packages were then transferred into a high pressure autoclave. After closing of the autoclave the temperature of the plates was raised during approximately 1½ hours by introducing steam of a temperature of 205° C, whereupon the autoclave temperature was maintained constant at 205° C. by continued introduction of steam at 205° C. and corresponding pressure during half an hour. The autoclave was then slowly cooled about 100° C., whereupon the packages of hydrothermally treated plates were returned to the drying chamber, where they were kept for about 24 hours at a temperature of about 100° C.

Before the autoclaving process the shaped plates had a pore number (pore volume divided by solid volume) of 0.19. During the autoclaving process the density of the solid material of the plates increased as a result of recrystallization in the presence of condensed water, while the total dimensions of each plate remained substantially unchanged, so that the hydrothermally treated plates had a pore number of 0.35. The plates produced had a compression strength of 150 MN/m$^2$ and a tensile strength in bending of 40 MN/m$^2$.

It will readily be perceived that construction and building materials produced in accordance with the above can be used advantageously to replace hitherto known objects or products used as construction material within, inter alia, the building industry and which are comprised of asbestos fibre material bound by means of cement. In this way the health hazards and environmental disadvantages observed and associated in later time with the handling of asbestos material are eliminated at the same time as economic advantages are gained.

We claim:

1. A starting material for manufacturing shaped and hydrothermally hardened objects, wherein the starting material mainly comprises a mixture of
   (a) material of the olivine type finely divided to a powdered product having a specific outer surface of at least approximately 25 000 cm$^2$/cm$^3$, measured in accordance with the permeability method,
   (b) finely divided silica material in a quantity which is at most equal to the solid volume of said powdered product and having such a small particle size that at least a predominant portion of said silica reacts during the hydrothermal treatment process,
   (c) ultra-basic rock and/or ultra-basic slag material finely divided to a particle size of 80% smaller than 200–1000 μm and comprising 50 – 80% of the total solid volume of the mixture.

2. A material according to claim 1, wherein at least part of the olivine-type material is finely divided to form a powdered product having a specific outer surface of 50 000 – 200 000 cm$^2$/cm$^3$.

3. A material according to claim 1, wherein the silica material comprises 1 – 7%, of the total solid volume of the mixture.

4. A material according to claim 1, wherein the ultra-basic rock and/or the ultra-basic slag material has a particle size of the order of magnitude of 80% smaller than 500 μm.

5. A material according to claim 1, wherein the ultra-basic rock and/or the ultra-basic slag material comprises approximately 65% of the total solid volume of the mixture.

6. A material according to claim 1, wherein the ultra-basic rock and/or the ultra-basic slag material comprises material of the olivine type.

7. A material according to claim 1 which further comprises a strongly basic substance in a quantity sufficient to increase the pH of the mixture to a value above 10.

8. A material according to claim 1, wherein the mixture is granulated.

9. A method of producing a starting material for the manufacture of shaped and hydrothermally hardened products, comprising the steps of finely dividing a material of the olivine type to a powdered product having a specific outer surface of at least 25 000 cm$^2$/cm$^3$, measured according to the permeability method, and mixing said product with finely-divided silica material in a quantity which is at most equal to the solid volume of said powdered product and having a particle size of such fineness that at least a predominant portion of the silica material will react during the hydrothermal treatment process, and with ultra-basic rock and/or ultra-basic slag material finely divided to a particle size of 80% smaller than 200 – 1000 μm and comprising 50 – 80% of the total solid volume of the mixture.

10. A method according to claim 9, wherein the dividing step comprises the step of conducting at least part of the dividing step in a dry state in a vibration mill.

11. A method according to claim 9, wherein the dividing step comprises the step of finely dividing at least part of the olivine-type material to a powdered product having a specific outer surface of 50 000 – 200 000 cm$^2$/cm$^3$.

12. A method according to claim 9, wherein the mixing step comprises the step of admixing silica material in an amount of from about 1 to 7% of the total solid volume of the mixture.

13. A method according to claim 9, wherein the ultra-basic rock and/or the ultra-basic slag material has a particle size of the order of magnitude of 80% smaller than 500 μm.

14. A method according to claim 9, wherein the mixing step comprises the step of admixing the finely divided ultra-basic rock and/or the finely divided ultra-basic slag material in a quantity of approximately 65% of the total solid volume of the mixture.

15. A method according to claim 9, wherein said ultra-basic rock and/or ultra-basic slag material comprises a material of the olivine type.

16. A method according to claim 9, further comprising the step of adding to the mixture a strongly basic substance in a quantity sufficient to increase the pH of the mixture to a value above 10.

17. A method according to claim 9, further comprising the step of granulating the mixture.

18. Shaped and hydro-thermally hardened objects manufactured from a starting material as claimed in claim 1.

19. Shaped and hydro-thermally hardened objects manufactured from a starting material produced by the method as claimed in claim 9.

20. A material according to claim 3, wherein the silica material comprises approximately 3–4% of the total solid volume of the mixture.

21. The method according to claim 12, wherein the mixing step comprises the step of admixing the silica material in an amount of approximately 3–4% of the total solid volume of the mixture.

* * * * *